United States Patent [19]

Mayerhoffer

[11] 4,285,843
[45] Aug. 25, 1981

[54] WOOD CHIP BOARD AND PROCESS FOR THE PREPARATION THEREOF

[75] Inventor: Herbert Mayerhoffer, Vienna, Austria

[73] Assignee: Osterreichische Hiag-Werke Aktiengesellschaft, Vienna, Austria

[21] Appl. No.: 141,844

[22] Filed: Apr. 21, 1980

[30] Foreign Application Priority Data

Apr. 23, 1979 [AT] Austria .................................. 3040/79

[51] Int. Cl.$^3$ ................................................ C08L 1/02
[52] U.S. Cl. ................................... 260/17.3; 264/109; 264/113; 264/122
[58] Field of Search ......................................... 260/17.3

[56] References Cited

U.S. PATENT DOCUMENTS

| | | | |
|---|---|---|---|
| 3,959,195 | 5/1976 | Eriksson | 260/17.3 |
| 4,035,120 | 6/1977 | Eriksson | 425/81 |

FOREIGN PATENT DOCUMENTS 856966 12/1960 United Kingdom ..................... 264/122

*Primary Examiner*—Edward M. Woodberry
*Attorney, Agent, or Firm*—Sughrue, Mion, Zinn, Macpeak and Seas

[57] ABSTRACT

A wood chip board the binder of which is an aminoplast, the amount of solid resin binder in the area of the surfaces of the board being less than 8% by weight of the chip material (absolutely dry) and the amount of solid resin binder in the area of the center of the board being equal or higher than in the area of the surfaces of the board as a percentage of the chip material in the center of the board. In preparing such a board the chip material providing the surfaces is advantageously glued with a liquor of an aminoplast the concentration of which is about 10 to 35% and preferably about 20 to 30%.

12 Claims, No Drawings

WOOD CHIP BOARD AND PROCESS FOR THE PREPARATION THEREOF

BACKGROUND OF THE INVENTION

1. Field of the Invention

The present invention relates to a wood chip board containing an aminoplast resin as binder, and also to a process for the preparation thereof.

2. Description of the Prior Art

The properties of wood chip boards are determined to a substantial degree by the binder combining the wood chips. Among these properties are, e.g., the strength values, the resistance of the boards to moisture and also the amount of chemically free remnant formaldehyde, which is even present in the binder after completion of the compression step. This amount of formaldehyde may cause highly undesirable environmental contamination if it escapes from the board. The properties of the boards are especially affected by the amount of the binder used, by the distribution thereof on the chip materials and by the degree of curing which occurs when the chip material is compressed. The composition of the binder also has a considerable influence on the properties of the boards.

Usually an increase in the amount of binder increases the strength values and also the resistance of the board to moisture; however, the binder is expensive compared to the cost of the chip material and this results in an increased expense, and, depending on the number of boards, also involves a higher amount of unreacted formaldehyde. In attempts to counteract the disadvantageous effects of free formaldehyde in the binder, hitherto the amount of the co-reactant for the formaldehyde present in the binder (e.g., urea or melamine) has been increased at the expense of the formaldehyde, so as to achieve as complete a bonding of the formaldehyde as possible in the course of the hot pressing step in which the boards are formed and cured. However, in this case, the increased expenditure for the increased amount of co-reactant in the binder is borne without enhancing the strength or resistance of the board.

Attempts have also been made to improve the properties of wood chip boards. For example, increased strength with a simultaneous decrease in the amount of free formaldehyde in the binder has been obtained by providing a longer compression period in the course of preparing the boards. This however, leads to a substantial increase in production expense, as the presses are an extremely high capital investment. Thus, it is necessary to try to get by with a compression period which is as short as possible.

SUMMARY OF THE INVENTION

It is an object of the present invention to prepare a wood chip board as defined above, which possesses, based on the amount of the binder used, good strength and resistance properties, and in which the amount of free formaldehyde present in the binder is also considerably reduced compared with previous wood chip boards.

It is another object of the present invention to produce a wood chip board with a very low production expenditure.

The wood chip board as defined above is characterized in that the amount of solid resin binder in the area of the board surfaces is less than 8% by weight of the a.d. calculated chip material in the area of the board surface, and the amount of solid resin binder in the area of the center of the board, calculated as a percentage based on the a.d. chip material present there, is equal to or greater than in the area of the board surfaces. Throughout the specification, the abbreviation "a.d." means "absolutely dry".

DETAILED DESCRIPTION OF THE INVENTION

It has been found that is possible to obtain easier and more uniform curing of the binder over the entire thickness of the board by considerably reducing the content of solid resin in the area of the board surfaces in the present invention as compared with the typical binder content. As a result, for a given amount of binder there is improved strength and better curing, and, as a direct consequence of the latter, a reduced amount of residual formaldehyde is present. It should be noted that the improvement in the properties thus obtained is not achieved by a longer compression time, but results from better propagation of the curing of the binder in the course of compressing the boards.

By providing a higher amount of resin with the chip material in the center of the board in accordance with a preferred embodiment of the present invention, the strength of the board is increased. This is a break with the conventional approach, according to which the center of the board contained considerably less resin than the surface layers and the surface layers have often contained more than 10% by weight solid resin based on the a.d. chip material.

A preferred embodiment of the wood chip board of the present invention is characterized in that in a known manner the fine portion of the chip material is concentrated or accumulated at the board surfaces and this fine portion contains less than about 7% by weight of solid resin, as binder, based on the a.d. calculated chip material at the surface. The coarse portion of the chip material is concentrated at the center of the board and contains at least about 6% by weight solid resin, preferably more than about 7% by weight resin based on the a.d. calculated coarse chip material at the center. Thus, very good properties are obtained with a small production expense on the basis of a typical board construction which is advantageous for many fabrication uses.

The present invention also relates to a process for preparing a wood chip board as defined above, in which the cut raw material is subjected to drying to give a moisture content of less than about 4%, preferably less than about 2%, and to size classification to provide a fine portion and a coarse portion. Then the fine portion and the coarse portion are independently coated or "glued" with aqueous aminoplast liquors, whereafter the chip material thus obtained is strewn into layers and compressed under pressure and heated to form a board. In strewing the glued chip materials, they are distributed such that in the area near the surfaces the fine portion predominates and in the center the coarse portion predominates. In the process of the present invention the fine portion of the chip material is glued with an aminoplast liquor having a solid resin concentration of about 10 to 35% by weight, in an amount of less than about 8% by weight solid resin based on the a.d. calculated fine portion of the chip material. Preferably the coarse portion of the chip material is bound in an amount, calculated as a precentage based on the a.d. calculated coarse portion of the chip material, at least equal to the amount of solid resin in the fine portion of the chip material.

By binding the fine portion of the chip material with an aminoplast liquor, the concentration of solid resin of which is about 10 to 35% by weight, a very good distribution of the binder on that portion of the chip material results and also the moisture content in the fine portion of the chip material is favorable for the compression step. This moisture content effectively supports heat transfer to the coarse portion of the chip material. At the same time a slow cure of the fine chips occurs, which is especially important if the fine chip material predominates in the area near the surfaces and the coarse chips predominate in the center area of the board. In this case, a particularly favorable curing of the binder is obtained over the entire board thickness in a relatively short period of time.

In the process of the present invention, it is particularly preferred to use an aminoplast liquor for binding the fine portion of the chip material, the concentration of solid resin of which is about 20 to 30% by weight.

A particularly preferred amount of solid resin for binding the fine portion of the chip material is about 5 to 6.5% by weight of the a.d. calculated fine portion of the chip material of solid resin.

To obtain relatively high strength it is favorable, if the coarse portion of the chip material contains (calculated as a percentage based on the a.d. calculated coarse portion of the chip material) at least about 1% by weight solid resin more than in the fine portion of the chip material.

For curing of the binder to satisfactorily progress in the course of hot pressing and also to obtaining relatively high strength properties, it is favorable to use an aminoplast liquor for binding the coarse portion of the chip material, the concentration of solid resin of which is about 30 to 55% by weight. Preferably an aminoplast liquor is used, the concentration of solid resin of which is about 35 to 45% by weight. For satisfactory curing it is also favorable to adjust the moisture content of the coarse portion of the chip material during the gluing step to a value less than about 8%.

The good and uniform distribution of the binder on the fine portion of the chip material obtainable by the process of the present invention produces a solid surface with a relatively small amount of solid resin. This fact may be also utilized inasmuch as in the center area of the board a relatively cheap urea resin can be used as binder and a better grade material e.g., a melamine resin can be used in the surface layers. It should be noted that for the technology of the present invention several aminoplasts are suitable; in addition to the urea resin and the melamine resin already mentioned also thiourea resins, dicyanodiamide resins and the like may be used.

By the use of a relatively low liquor concentration for gluing that portion of the chip material which is present primarily in the surface area of the board provided in the process of the invention as already mentioned, the curing rate in the surface area is reduced, but in the center area of the boards the curing rate is increased due to the higher concentration of the binder liquor used for gluing the chip material present there and the intensive heat transfer from the board surfaces. As a result maximum curing of the binder is achieved in a relatively short period of time and the binder develops a maximum bonding strength. Only at the end of the hot compression does a cured cover layer develop. Typical compression conditions are about 150° to 215° C. and 7 to 30 seconds for each mm of board thickness.

The distribution of the chips in the chip cake to be compressed to give the board from the chip fractions separately glued according to the process of the invention may be effected in different ways. For example, it is possible to form from the fractions a multi-layer pile (Schuttung) which is compressed to give a multilayer board. However, it is also possible to mix the fractions after gluing and to prepare a chip mat (Spanvlies) by means of an apparatus which causes a partial distribution of the chip material fed thereto, in which mat the fine portion is concentrated in the area of the surfaces and correspondingly thereto the coarse portion of the chip material is concentrated in the center of the board, which results in a better bonding of the layers than in case of separate throwing.

The aminoplast liquor used as binder for the surface area and for the chips in the cover layer of the board respectively may advantageously be free of curing agents, as the surface layers should cure slowly. With the absence of curing agents there is the advantage that unreacted acid precipitates cannot remain on the board surfaces, which could later lead to corrosion of workpieces brought into contact with such boards. However, it may be advantageous to add curing agents to the aminoplast liquor used to form the middle of the board.

By analogy to related technologies various additives can also be used in the present invention, such as a paraffin emulsion, protective agents against fungi and the like, and added to the chip material. Such additives may be used independently from the binder liquor or in admixture therewith. In particular, a paraffin emulsion is typically added as a hydrophobic agent in amounts of about 0.3 to 1.2 wt% based on the a.d. chip material.

The following examples illustrate the present invention in more detail.

EXAMPLE 1

A mixture of 25% trunk wood, 40% waste material of saw mills and 35% chopping pieces (a raw material consisting mainly of waste wood) was comminuted to chips using technology conventional in the chip board industry. This chip material was dried to a residual moisture of 1% and subjected to a size classification in a screening device to give a fine portion and a coarse portion. Then the fine portion, the amount of which was about 35% by weight of the total chip material, was glued with an aqueous liquor of an urea-formaldehyde-glue having a concentration of 23% by weight of solid resin and containing additionally a paraffin emulsion. The amount of glue was selected such that the glued fine portion of the chip material had a gluing degree of 5.2% by weight solid resin calculated on the basis of a.d. chip material. The moisture content of the glued chip material was 16%. The coarse portion of the chip material was glued in a separate gluing step in a mixer with an aqueous liquor of an urea-formaldehyde-glue having a concentration of 42.5% by weight of solid resin and containing ammonium chloride in an amount of 1.8% by weight based on the solid resin, and additionally a paraffin emulsion as a hydrophobication agent. The amount of the liquor used was selected such that the amount of resin in the coarse portion of the chip material was 5.8% by weight calculated on the basis of a.d. chip material. The moisture content of the glued chip material was 7%. The chip material so prepared was thrown to give a three-layer chip mat having the fine portion of the chip material mainly in the two cover layers and the coarse portion almost exclusively in the middle layer. This chip mat was compressed in a hot press under heat and pressure at a compression rate of 15 sec/mm raw thickness to give a chip board having a thickness of 19 mm and a specific weight of 690 kg/m$^3$. The examination of the thus obtained chip board with respect to the requirements of DIN 68.763 showed that the board meets excellently with the requirements thereof.

EXAMPLE 2

A raw material consisting substantially of trunk wood (80% coniferous wood and 20% light hard wood) was chipped and the chip material was dried in a manner analogous to that described in Example 1 and divided into a fine portion and a coarse portion. The fine portion and the coarse portion of the chip material were separately glued with aqueous liquors of an urea-formaldehyde-glue having a molar ratio of 1:1.4, and rendered hydrophobic by spraying hot paraffin onto the chips (fine portion 1% by weight/a.d. chips, coarse portion 0.7% by weight/a.d. chips). For gluing the fine portion a liquor containing 26.6% by weight of solid resin with an addition of 0.2% by weight of ammonium chloride (based on solid resin) as curing agent was used. This liquor was used in an amount such that a gluing degree of 4.5% by weight solid resin calculated on basis of a.d. fine portion of the chip material resulted. Furthermore the moisture content of the glued chips was 12.5% for gluing the coarse portion of the chip material, a glue liquor containing 58.2% by weight of solid resin including 2.0% by weight of ammonium chloride (calculated on the basis of solid resin) was used. The amount of the liquor was selected such that the amount of resin in the coarse portion was 6.5% based on the a.d. coarse portion. Furthermore, the moisture content of the glued chips was 7%. Then the two glued portions of the chip material were mixed and distributed to give a chip mat. A distributing device having a separating effect was used. Thereby the fine chip material came to lie substantially in the cover layers and the coarse chip material substantially in the middle layer. This chip mat was compressed in a press having one floor under pressure and heat at a rate of 8 sec/mm raw thickness to give a board having a thickness of 22 mm and a specific weight of 680 kg/m$^3$. After conditioning the board was examined. It showed a flexure strength of 16.7 N/mm$^2$ and a transverse tensile strength of 0.37 N/mm$^2$. Furthermore the separation of formaldehyde from the finished chip board was examined by the FESYP-method and a value of 16 mg/100 g of the chip board was observed (FESYP=Federation European Syndicate des Fabricants des Panneaux des Particules).

EXAMPLE 3

A chip material prepared from a similar raw material as described in Example 1 and classified into a fine portion and a coarse portion was dried. Thereafter the fine portion had a moisture content of 2.5% and the coarse portion had a moisture of 1%. The fine portion was glued with a liquor of a melamine resin containing 32% by weight of solid resin with the addition of a paraffin emulsion. An amount of 5.0% by weight of solid resin, calculated on basis of a.d. fine portion of the chip material was formed. The moisture content of the glued chips was 10.5%. The coarse portion of the chip material was glued with a liquor of an urea-formaldehyde-glue containing 44.6% by weight of solid resin also with an addition of a paraffin emulsion and of a curing agent (2% by weight of ammonium chloride based on solid resin). By appropriate selection of the amount of the liquor the amount of solid resin was 6.2% by weight calculated on the basis of a.d. chip material. The moisture content of the glued chips was 7.2%. In an analogous manner to Example 1 the two portions of the chip material were scattered to give a three-layer mat, which was compressed at a compression rate of 12 sec/mm raw thickness to give a three-layer board having a thickness of 19 mm and a specific weight of 690 kg/m$^3$. The board was examined and it satisfied the requirements of DIN 68.763.

EXAMPLE 4

A chip material prepared only from trunk wood having a low content of dust was dried to give a moisture content of 1% and classified into a fine portion and a coarse portion. Then the fine portion of the chip material was glued with a liquor of a urea-formaldehyde-glue containing 19% by weight of solid resin also with an addition of a paraffin emulsion. The amount of the liquor was selected to provide the chip material with 3.8% by weight solid resin, based on the a.d. fine portion of the chip material, and a moisture content of the glued chip material of 15.5% was obtained. The coarse portion was glued with an aqueous liquor containing 35% by weight of solid resin of an urea-formaldehyde-glue with 2% by weight of ammonium chloride (based on solid resin) and additionally a paraffin emulsion. An amount of 4.8% by weight of solid resin, based on the a.d. coarse portion of the chip material was applied, resulting in a moisture degree of 8%. Then the two portions of the chip material were mixed and analogous to Example 2 distributed to give a chip mat. This mat was compressed under pressure and heated at a rate of 17 sec/mm raw thickness to give a board having a thickness of 16 mm and a specific weight of 720 kg/m$^3$. The subsequent examination of the board showed values corresponding to DIN 68.763.

While the invention has been described in detail and with reference to specific embodiments thereof, it will be apparent to one skilled in the art that various changes and modifications can be made therein without departing from the spirit and scope thereof.

What is claimed is:

1. A wood chip board the binder of which is an aminoplast, in which the amount of solid resin binder in the area of the board surfaces is less than about 8% by weight of the absolutely dry calculated chip material in the board surface, and the amount of solid resin binder in the area of the center of the board calculated as a wt. percentage based on the absolutely dry chip material present at the center, is equal to or greater than in the board surfaces.

2. The wood chip board of claim 1, wherein the fine portion of the chip material is concentrated in the area of the board surfaces, and this fine portion contains less than about 7% by weight solid resin based on the absolutely dry calculated chip material, and the coarse portion of the chip material is concentrated in the area of the center of the board and contains at least 6% by weight solid resin, based on the absolutely dry calculated chip material.

3. A process for preparing a wood chip board which comprises drying a cut raw material to give a moisture content of less than about 4%, classifying the dried material into a fine portion and a coarse portion, gluing the fine portion and the coarse portion independently with aqueous aminoplast liquors, distributing the glued chip material thus obtained such that in the area near the surfaces the fine portion predominates and in the center area the coarse portion predominates, and compressing the chip material under pressure and heat to form a board, in which process the fine portion of the chip material is glued with an aminoplast liquor the concentration of solid resin of which is about 10 to 35% by weight, and the amount of solid resin in the surface areas of the board is less than about 8% by weight based on the absolutely dry calculated fine portion of the chip material in the surface, and the amount of solid resin binder in the center of the board calculated as a percentage based on the absolutely dry calculated coarse portion of the chip material is at least equal to the amount of solid resin in the surface portions of the board.

4. The process of claim 3, wherein the aminoplast liquor for gluing the fine portion of the chip material has a concentration of solid resin of about 20 to 30% by weight.

5. The process of claim 3 or 4, wherein the amount of resin binding the fine portion of the chip material is about 5 to 6.5% by weight (as solid resin) based on the absolutely dry calculated fine portion of the chip material.

6. The process of claim 3 or 4, wherein the coarse portion of the chip material contains at least 1% by weight or more solid resin than the fine portion of the chip material based on the respective absolutely dry calculated chip materials.

7. The process of claim 3 or 4, wherein the aminoplast liquor binding the coarse portion of the chip material has a concentration of solid resin of about 30 to 55% by weight.

8. The process of claim 7, wherein the aminoplast liquor has a solid resin concentration of about 35 to 45% by weight.

9. The process of claim 3 or 4, wherein during the gluing step the moisture content of the coarse portion of the chip material is less than about 8%.

10. The process of claim 3 or 4, wherein the aminoplast resin used for gluing the coarse portion of the chip material is a liquor which contains a urea-formaldehydecondensate or a urea-rich aminoplast as resin, and the aminoplast for gluing the fine portion of the chip material is a liquor containing a melamine resin.

11. A wood chip board, comprising: wood chips and an aminoplast binder wherein fine wood chips are concentrated near surfaces of said board and relatively coarser wood chips are concentrated in a center area of said board and wherein said aminoplast binder near said surfaces of said board contains about 20 to 30% by weight solid resin, and wherein said aminoplast binder in said center area of said board contains at least 1% by weight calculated as a percentage based on the absolutely dry caclulated coarser wood chips more solid resin than is contained in said aminoplast binder near said surfaces.

12. A wood chip board of claim 1, wherein a fine portion of chip material is concentrated in an area of the board surfaces, and said fine portion contains about 5 to 6.5% by weight solid resin based on the absolutely dry calculated chip material, and the coarse portion of the chip material is concentrated in the center area of the board and contains at least about 1% by weight solid resin more than in the fine portion of the chip material.

* * * * *